Patented Sept. 20, 1949

2,482,736

UNITED STATES PATENT OFFICE 2,482,736

DRYING OIL PRODUCTS AND PROCESS OF MAKING SAME

John B. Rust, Montclair, N. J., assignor to Montclair Research Corporation, a corporation of New Jersey No Drawing. Application October 7, 1944, Serial No. 557,729

14 Claims. (Cl. 260—404.8)

This invention relates to drying oils modified by reaction with poly-unsaturated esters, and particularly by reaction with beta-unsaturated monohydric alcohol esters of unsaturated hydrophthalic acids.

An object is to improve the drying, color-stability and bodying characteristics of drying oils, particularly drying oils of the soft-drying type, in order to utilize such oils to greater advantage in varnishes and other coating compositions. Another object is to provide a method whereby these qualities may be imparted to drying oils in a simple manner. Other objects will be apparent from the description which follows.

In my copending application Serial No. 504,294, filed September 29, 1943, now Patent No. 2,467,912, I have described and claimed the modified drying oils obtained by heating drying oils with allyl esters of alpha-unsaturated alpha-beta-dicarboxylic acids such as diallyl fumarate. The present application is a continuation-in-part based on said copending application.

The modified drying oils of this invention are obtained by heating a drying oil with an ester which consists of an unsaturated hydrophthalic acid esterified with a beta-unsaturated monohydric alcohol. These esters include compounds such as the allyl, methallyl, crotyl and chloroallyl alcohol and methyl vinyl carbinol esters of hydrophthalic acids, these acids being the reaction products or adducts of alpha-unsaturated-alphabeta-dicarboxylic acids or anhydrides with conjugated polyenes; for example, the reaction products of maleic, fumaric, citraconic, itaconic and acetylene dicarboxylic acids with such conjugated polyenes as butadiene, isoprene, cyclopentadiene, piperylene, chloroprene, dihydrobenzene, terpenes, furane, pyrrole and the like. The tetrahydrophthalic acids are esterified with the allyltype alcohol in any way preferred, although in some cases the allyl ester may be obtained directly by heating an ester such as diallyl fumarate with the polyene. These esters are capable of being distilled and thus are available in a pure form as substantially water-white high-boiling liquids, capable of polymerization to light-colored infusible gels when heated in the presence of a polymerization catalyst.

The simplest example of a beta-unsaturated monohydric alcohol ester of an unsaturated hydrophthalic acid as used herein is diallyl 1,2,3,6-tetrahydrophthalate (the diallyl ester of the adduct of butadiene and maleic acid) whose formula is

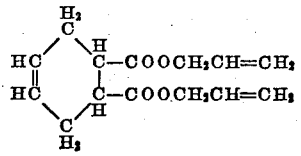

In the case of other unsaturated alcohol esters of conjugated polyene-unsaturated dibasic acid adducts, the esters have the same base formula but hydrogen atoms of the ring or alcohol radical are replaced by other groups. However, the beta-unsaturated monohydric alcohol esters of conjugated-polyene-acetylene dicarboxylic acid adduct comprise hydrophthalates having greater unsaturation than the above. The hydrophthalates have at least one double bond in the ring and this is in the 4,5-position.

The oils to be treated may be any unsaturated oil with drying properties such as tung, oiticica, linseed, soya bean, perilla, sunflower, walnut, cottonseed, dehydrated castor oil and the like. Tung oil and oiticica oil are known as hard-drying oils. As noted above, the invention applies particularly to the soft-drying oils, exemplified by linseed, and it is, therefore, an object herein to treat such soft-drying oils to impart properties thereto which make them more nearly like tung oil. The treated oils may be used to make varnishes with any of the oil-soluble resins. Such varnishes are rapid bodying, fast drying and light colored.

In reacting the drying oil with the allyl hydrophthalate, the proportions of reactants and the time and temperature of heating may be varied. The amount of ester required may vary over wide ranges, for example, between about 2% and 75%. I prefer to use between 5% and 50% of ester, based on the oil. In regard to the temperature, this is between 200° and 300° C. and preferably between about 250° and 275° C. The time of treatment determines the viscosity of the product. Since the reactants are non-volatile at the reaction temperature, any sort of reaction vessel may be used. However, for the lightest color, provision should be made for heating in the presence of an inert gas.

The drying oil and unsaturated ester are usually heated without addition of other material. However, they may be heated in the presence of resins, if desired. For example, a solution of a resin in a drying oil (e. g., linseed oil and rosin glyceride) may be treated with an allyl hydrophthalate to make a modified varnish base for fast-drying varnishes. Likewise, derivatives of drying oils such as drying oil-alkyd resins may be treated in this way. Drying oil acids may also be reacted.

The following are examples which are illustrative of the invention. Parts are by weight.

*Example 1.*—150 parts of raw linseed oil and 7.5 parts of the diallyl ester of a cyclopentadiene-maleic anhydride adduct (endomethylene-1,2,3,6-tetrahydrophthalic anhydride) were heated together in a round-bottom flask, equipped with a thermometer and an air condenser, slowly to 250° C. over a period of 1 hour. Heating was continued thereafter at 250°–265° C. for 3 hours to give a clear, light-colored oil which possessed a Gardner viscosity of F.

Example 2.—150 parts of raw linseed oil and 15 parts of the diallyl ester of cyclopentadiene-maleic acid were heated as in Example 1. The product was a clear, light-colored oil which possessed a Gardner viscosity of I.

Example 3.—150 parts of raw linseed oil and 30 parts of the diallyl ester of cyclopentadiene-maleic acid were heated together as in Example 1. The product was a clear, light-colored oil which possessed a Gardner viscosity of O.

In the above examples the reactants were heated under the same conditions but the amount of the unsaturated ester was varied. Raw linseed oil was heated under like conditions. The various oils were compared in regard to their tendency to gel when heated. This was done by heating a sample to 315° C. and holding it at that point until it gelled. The "gel time" is the number of minutes at 315° C. required by an oil in order to cause gelation. The following shows a comparison of the various oils in regard to viscosity and gel time. The bodied linseed oil was darker than the others.

| Example | Ester, per cent | Viscosity, poises | Gel time, minutes |
|---|---|---|---|
|  | 0 | 1.0 | 70 |
| 1 | 5 | 1.4 | 20 |
| 2 | 10 | 2.25 | 14 |
| 3 | 20 | 3.7 | 4 |

Ester gum varnishes (25-gallon length) using the treated oils of Example 1, 3 and 3, together with the bodied untreated oil for comparison, and showing the effect of modifying linseed oil with varying amounts of diallyl endomethylene-tetrahydrophthalate are shown below. The varnishes were made by heating 2 parts of the oil with 1 part of rosin ester to 300° C. during a half hour and holding at 300°-310° C. until a cold test drop of the melt on a glass plate could be pulled into strings 15-20 inches long. The time in minutes required at 300°-310° C. to reach this stage is given as the "time to body." The bases were reduced to 50% solids by weight with mineral spirits and naphthenate drier was added (0.5% Pb and 0.02% Co based on the oil). The raw linseed varnish was very dark; the color of the others was light, that of Example 3 being very light. Drying time (in hours) of the various varnishes is given.

| Example | Per Cent Ester | Time to body | Drying time | |
|---|---|---|---|---|
|  |  |  | Dust-free | Tack-free |
|  | 0 | 90 | 2 | 5¾ |
| 1 | 5 | 65 | 1¾ | 5½ |
| 2 | 10 | 18 | 1½ | 4½ |
| 3 | 20 | 8 | 1¼ | 4 |

Example 4.—150 parts of soya bean oil and 15 parts of the diallyl ester of cyclopentadiene-maleic acid were heated together to 250° C. over a period of 1 hour. Heating was continued thereafter at 250°-265° C. for 3¾ hours to give a clear, light-colored oil which possessed a Gardner viscosity of J (2.5 poises). Gel time 33 minutes.

Example 5.—150 parts of soya bean oil and 15 parts of an addition-reaction product of diallyl fumarate and cyclopentadiene were heated together to 250° C. over a period of 1 hour. Heating was continued thereafter at 250°-265° C. for 5¾ hours to give a clear, light colored oil which possessed a Gardner viscosity of H (2.0 poises). Gel time 29 minutes.

Example 6.—150 parts of soya bean oil and 15 parts of the diallyl ester of butadiene-maleic acid (diallyl tetrahydrophthalate) were heated together to 250° C. over a period of 1 hour. Heating was continued thereafter at 250°-265° C. for 4¼ hours to give a clear, light colored oil which possessed a Gardner viscosity of D (10 poises). Gel time 41 minutes.

Example 7.—150 parts of raw soya bean oil and 22.5 parts of the diallyl ester of a butadiene-maleic adduct were heated to 250° C. over a period of 1 hour. Heating was continued thereafter at 250°-265° C. for 4 hours to give a clear, light-colored oil which possessed a Gardner viscosity of F (14 poises). Gel time 21 minutes.

Example 8.—100 parts of raw soya bean oil and 50 parts of the diallyl ester of isoprene-maleic acid (3-methyl-1,2,6-tetrahydrophthalic acid) were heated together to 250° C. over a period of 1 hour. Heating was continued thereafter at 250°-265° C. for 3¼ hours to give a clear, light-colored oil which possessed a Gardner viscosity of T (5.5 poises). Gel time 30 minutes.

The above examples illustrate the treatment of naturally occurring drying oils with an unsaturated hydrophthalate ester of a beta-unsaturated monohydric alcohol. Synthetic drying oils may be made by reacting the fatty acids of drying oils with a polyhydric alcohol other than glycerol, and such drying oils when treated with the unsaturated ester are also within the scope of this invention. For example, the pentaerythritol ester of linseed oil acids can be heated with the unsaturated ester in the same way as can the glyceride. In the case of such synthetic drying oils, the modified oil may often be obtained advantageously by simultaneous heating of a mixture of a polyhydric alcohol, drying oil fatty acids and the unsaturated hydrophthalate.

I claim:

1. The process of heating a drying oil and a beta-unsaturated monohydric alcohol ester of a 1,2,3,6-tetrahydrophthalic acid, at between 200° C. and 300° C. whereby the drying oil is improved as regards color-stability, gel time and drying time.

2. The process of improving the color-stability, drying and bodying properties of a drying oil which comprises heating a drying oil and a diallyl 1,2,3,6-tetrahydrophthalate at between 200° C. and 300° C.

3. The process of improving the color-stability, drying and bodying characteristics of linseed oil which comprises heating a mixture of linseed oil and a diallyl 1,2,3,6-tetrahydrophthalate at between 200° C. and 300° C.

4. The process of improving the color-stability, drying and bodying characteristics of soya bean oil which comprises heating a mixture of soya bean oil and a diallyl 1,2,3,6-tetrahydrophthalate at between 200° C. and 300° C.

5. The process of improving the color-stability, drying and bodying characteristics of a drying oil which comprises heating a drying oil and diallyl 1,2,3,6-tetrahydrophthalate at between 200° C. and 300° C.

6. The process of improving the color-stability, drying and bodying characteristics of a drying oil which comprises heating a drying oil and diallyl endomethylene-1,2,3,6-tetrahydrophthalate at between 200° C. and 300° C.

7. The process of improving the color-stability, drying and bodying characteristics of a drying oil which comprises heating a drying oil and diallyl 3-methyl-1,2,3,6-tetrahydrophthalate at between 200° and 300° C.

8. A drying oil improved as regards color-stability, bodying and drying characteristics which comprises the heat-reaction product of a drying oil and a beta-unsaturated monohydric alcohol ester of a 1,2,3,6-tetrahydrophthalic acid.

9. A drying oil improved as regards color-stability, bodying and drying characteristics which comprises the heat-reaction product of a drying oil and a diallyl 1,2,3,6-tetrahydrophthalate.

10. A drying oil improved as regards color-stability, bodying and drying characteristics which comprises the heat-reaction product of linseed oil and a diallyl 1,2,3,6-tetrahydrophthalate.

11. A drying oil improved as regards color-stability, bodying and drying characteristics which comprises the heat-reaction product of soya bean oil and a diallyl 1,2,3,6-tetrahydrophthalate.

12. A drying oil improved as regards color-stability, bodying and drying characteristics which comprises the heat-reaction product of a drying oil and diallyl 1,2,3,6-tetrahydrophthalate.

13. A drying oil improved as regards color-stability, bodying and drying characteristics which comprises the heat-reaction product of a drying oil and diallyl endomethylene-1,2,3,6-tetrahydrophthalate.

14. A drying oil improved as regards color-stability, bodying and drying characteristics which comprises the heat-reaction product of a drying oil and diallyl 3-methyl-1,2,3,6-tetrahydrophthalate.

JOHN B. RUST.

REFERENCES CITED

The following references are of record in the file of this patent:

UNITED STATES PATENTS

| Number | Name | Date |
| --- | --- | --- |
| 2,033,131 | Ellis | Mar. 10, 1936 |
| 2,118,308 | Jaeger | May 24, 1938 |
| 2,188,882 | Clocker | Jan. 30, 1940 |
| 2,275,843 | Clocker | Mar. 10, 1942 |
| 2,280,862 | Sorenson | Apr. 28, 1942 |
| 2,306,281 | Rust | Dec. 22, 1942 |
| 2,312,731 | Salathiel | Mar. 2, 1943 |